United States Patent [19]
Van Steenburgh, Jr.

[11] Patent Number: 4,815,298
[45] Date of Patent: Mar. 28, 1989

[54] REFRIGERATION SYSTEM WITH BYPASS VALVES

[76] Inventor: Leon C. Van Steenburgh, Jr., 1900 South Quince, Denver, Colo. 80231

[21] Appl. No.: 142,130

[22] Filed: Jan. 11, 1988

Related U.S. Application Data

[63] Continuation-in-part of Ser. No. 927,880, Nov. 6, 1986, Pat. No. 4,718,245.

[51] Int. Cl.$^4$ .............................................. F25B 41/00
[52] U.S. Cl. ..................................... 62/196.4; 62/197; 62/200; 62/509
[58] Field of Search ...................... 62/196.4, 197, 200, 62/509

[56] References Cited

U.S. PATENT DOCUMENTS

| | | | |
|---|---|---|---|
| 3,389,576 | 6/1968 | Mauer | 62/196.4 |
| 3,481,152 | 12/1969 | Seeley | 62/196.4 |
| 3,525,234 | 8/1970 | Widdowson | 62/151 |
| 3,555,842 | 1/1971 | Badcher | 62/196.4 |
| 3,555,843 | 1/1971 | Cook | 62/196.4 |
| 4,023,377 | 5/1977 | Tomita | 62/196.4 |
| 4,136,528 | 1/1979 | Vogel et al. | 62/196.4 |
| 4,286,437 | 11/1981 | Abraham et al. | 62/509 |

*Primary Examiner*—Ronald C. Capossela
*Attorney, Agent, or Firm*—Holme Roberts & Owen

[57] ABSTRACT

A refrigeration system comprising, in combination, an evaporator, control means controlling the flow of a liquid refrigerant at a reduced pressure to said evaporator for producing a gaseous refrigerant at a lower pressure and temperature in said evaporator, a compressor for receiving said gaseous refrigerant from said evaporator and compressing said refrigerant to produce a refrigerant at an increased temperature and pressure, a condenser remote from said compressor and evaporator for receiving said refrigerant at increased temperature and pressure and condensing the same to a liquid, a receiver for receiving said condensed liquid refrigerant, first transport means normally supplying said condensed liquid from said receiver to said control means, second transport means supplying said condensed liquid from said control means to said evaporator, a first bypass valve for supplying gaseous refrigerant at said increased pressure and temperature to the interior of said receiver falls below a predetermined value, a second bypass valve for supplying gaseous refrigerant at an increased pressure and temperature directly to said second transport means and bypassing said control means when the temperature in said evaporator falls below a predetermined value.

4 Claims, 5 Drawing Sheets

REFRIGERATION SYSTEM WITH BYPASS VALVES

CROSS-REFERENCE TO RELATED APPLICATION

This is a continuation-in-part of co-pending application Ser. No. 06/927,880 filed Nov. 6, 1986 now U.S. Pat. No. 4,718,245, for "Refrigeration System with Bypass Valves."

FIELD OF THE INVENTION

The present invention relates to refrigeration systems with a condenser bypass valve and a hot gas bypass valve, which system finds particular but not exclusive utility in connection with a refrigerated gas separation apparatus and, more particularly, refrigerated dryers and separators for removing moisture from compressed air.

BACKGROUND OF THE INVENTION

Refrigerated dryers and moisture separators for removing moisture from compressed air are generally old and well-known in the art. Such apparatus conventionally includes a conditioner or equalizer in the form of a shell and tube heat exchanger for cooling incoming hot, moist compressed air and warming outgoing cold, dried compressed air. The cooled, moist compressed air is then contacted with the refrigeration evaporator which further lowers the temperature of the compressed air, thereby causing moisture to condense for removal in a separator. Condensed moisture is removed and the cold, relatively drier compressed air is directed through the equalizer heat exchanger to cool incoming hot, moist compressed air before being discharged to the utility circuit.

The refrigeration evaporator is part of a conventional refrigeration circuit, including a refrigerant compressor, condenser, refrigerant receiver or reservoir, expansion valve or orifice, and evaporator.

A refrigerating system having a remote condenser subject to low ambient temperatures is shown and described in previously filed application Ser. No. 06/927,880, filed Nov. 6, 1987, now U.S. Pat. No. 4,718,245. The disclosure of said U.S. Pat. No. 4,718,245 is incorporated by reference herein and made a part hereof.

The refrigeration circuit shown in U.S. Pat. No. 4,718,245 is an electromechanical refrigerating system which includes a receiver located close to the compressor and also as close to the evaporator as possible. The receiver acts as a reservoir with a volume capacity corresponding to that of both the evaporator and condenser. During periods of low condenser ambient temperature, the refrigerant liquefies near the start of the condenser coil and the condenser is full of liquid refrigerant. During periods of high ambient temperature outside the condenser coil, the refrigerant does not cool and liquefy until near the end of the condenser coil and, because the gaseous refrigerant occupies a much greater volume than the liquid refrigerant, a reservoir such as the receiver is required for the remaining refrigerant.

When the ambient temperature outside the condenser coil is very low, with correspondingly low refrigerant temperatures in the receiver, the pressure and temperature drop across the thermostatic expansion valve are too low for effective operation o that valve. The thermostatic expansion valve is controlled by the temperature in the outlet line of the evaporator and when the temperature in that line is nearly as low as the temperature of the liquid refrigerant in the line connecting the receiver and the evaporator, the expansion valve will function either very slowly or not at all. This problem is overcome, in part, with a condenser bypass valve which directs hot gaseous refrigerant directly into the receiver from the compressor, bypassing the condenser in the event the pressure of the liquid from the condenser falls below a predetermined level, as measured by the pressure differential between the gaseous compressor refrigerant and the liquid condenser refrigerant. The hot gaseous refrigerant discharged from the condenser bypass valve into the receiver quickly raises the temperature of the receiver refrigerant before it is routed to the thermostatic expansion valve.

Such a system is particularly useful during initial start-up under cold temperature conditions. The condenser bypass valve gradually throttles down the flow of hot gas from the compressor into the receiver as the temperature and pressure in the evaporator rise to desired levels by reason of the addition of heat to the liquid refrigerant in the receiver. Eventually, the condenser and other components approach normal operating temperatures and pressures, and no hot gas bypass of the condenser is required, but as indicated transfer of heat through the liquid refrigerant line from the receiver to the expansion valve is gradual.

To facilitate a more rapid rise in temperature and pressure in the evaporator and thus to promote more rapid functioning of the expansion valve and hence a more rapid rise in temperatures and pressures throughout the evaporator, an expansion valve bypass is employed in the system of U.S. Pat. No. 4,718,245. This second bypass valve directs hot, high pressure gaseous refrigerant from the compressor directly to either the inlet or the outlet line of the evaporator thus rapidly raising the temperature in the expansion valve bulb connected to the evaporator outlet line and causing the expansion valve to function more quickly. In an alternative arrangement the expansion valve bypass is arranged to route refrigerant vapor from the receiver to the evaporator. This vapor, while cooler than compressed refrigerant from the compressor nevertheless is hotter than refrigerant in the evaporator and thus will attain the desired result of raising the pressure and temperature in the evaporator.

The bypass valves are pressurized diaphragm biased disk valves, and each includes a pressure dome and diaphragm operator. The pressure dome defines a chamber closed by a flexible diaphragm. An adjusted gas pressure is established and maintained in the dome chamber, in opposition to a coil spring or other mechanical biasing device, to provide a constant, predetermined differential biasing force on the valve at a given temperature. In order to maintain the gas in the dome at a relatively constant pressure, it is necessary to maintain the gas at a relatively constant temperature and this can be accomplished satisfactorily by hermetically sealing the valves and locating them both within the receiver.

The bypass valves respond directly to pressure changes of a predetermined magnitude and only indirectly to changes in temperature. For example, a drop in the temperature in the condenser below the desired level causes a drop in pressure in the condenser outlet line and in that side of the condenser bypass valve. This drop in pressure permits the pre-set pressure in the dome of the valve to overcome the force of the biasing spring and open the valve to permit flow of hot compressed gas into the receiver. Likewise a drop in the temperature in the evaporator below the desired level causes a drop in pressure in the outlet line of the expansion valve bypass causing the pre-set pressure in that bypass valve to overcome the force of its biasing spring and open the valve to permit flow of hot compressed gas directly to the evaporator. The sequences just described gradually bring the temperature of the refrigerant in the receiver and in the evaporator to the desired levels and the bypass valves then close causing the normal cycle of refrigerant flow from the receiver to the expansion valve, then through the evaporator, the compressor and the condenser back to the receiver. Because of the gradual nature of the sequence of bypass valves opening and closing in response to temperature changes, at ambient temperatures near 32° F. or below, there is an approximate variation of about 7° or 8° F. in the temperature of refrigerant in the middle of the condenser between the start of the bypass sequence and the end of the sequence.

It is highly desirable that the temperature of the refrigerant in the middle of the condenser be as consistently low as possible without danger of icing around the evaporator coils. Consequently, the primary object of the present invention is to control the temperature variation of the refrigerant in the middle of the evaporator to within a range of 1° to 2° F.

This object can be accomplished by utilizing in the refrigeration circuit of U.S. Pat. No. 4,718,245 an expansion valve bypass valve having a sealed chamber on the side of the valve diaphragm opposite the pre-set pressure dome of the valve and providing means for admitting compressed gas to the sealed chamber in response to an electrical temperature sensor located in the middle of the evaporator. The sensor sends a signal to an electrical control circuit, a signal indicating the temperature of refrigerant in the middle of the evaporator and the control circuit can be set to open a solenoid valve at a lower temperature and close it at higher temperature with the difference between the lower and higher temperature being as little as 1° to 2° F. The solenoid valve is in a fluid conduit in fluid communication with the pressure side of the compressor at one end and with the sealed chamber in the expansion valve bypass valve at the other end. The expansion valve bypass valve has an inlet in fluid communication with the upper or vapor-containing portion of the receiver and an outlet in fluid communication with the valve body of the expansion valve. When the temperature of the refrigerant in the middle of the evaporator drops to the lower temperature of the range pre-set in the electrical control circuit the solenoid valve is opened, relieving the pressure from the compressor and immediately permitting the expansion valve bypass valve to open thus connecting the evaporator outlet line and the valve body and the expansion valve body in fluid communication with the vapor-containing portion of the receiver resulting in an increase in pressure in the evaporator and in the body of the expansion valve. This sequence instantly stops any further drop in temperature in the evaporator and initiates conditions which will cause this temperature to rise. When this temperature rises to the higher temperature of range pre-set in the electrical control circuit the solenoid valve is closed and the expansion valve bypass valve is closed. Of course at this point the condenser bypass valve may or may not be routing compressed gas directly into the receiver since it functions directly in response to the pressure and thus indirectly to the temperature of refrigerant in the outlet of the condenser.

DESCRIPTION OF THE DRAWINGS

Referring to FIG. 1 of the drawing there is shown a refrigeration circuit having a receiver 10, an evaporator 60, a compressor 80 and a condenser 90. Within the receiver 10 is a condenser bypass valve 11 and an expansion valve bypass valve 12. Opening near the bottom of receiver 10 is a liquid refrigerant discharge conduit 13. Opening at a higher level within receiver 10 is a refrigerant inlet conduit 14 which is normally in fluid communication through valve 11 with conduit 15 which is in fluid communication with the liquid refrigerant discharge conduit 91 of the condenser 90. When pressure in conduit 15 is below a predetermined level valve 11 is actuated to connect conduit 14 in fluid communication with conduit 17 which is in fluid communication with compressor discharge conduit 81. Conduit 18 leading into valve 12 is likewise in fluid communication with compressor discharge conduit 81 and through valve 12 with expansion valve bypass conduit 19 and evaporator inlet conduit 61.

Figure 1:
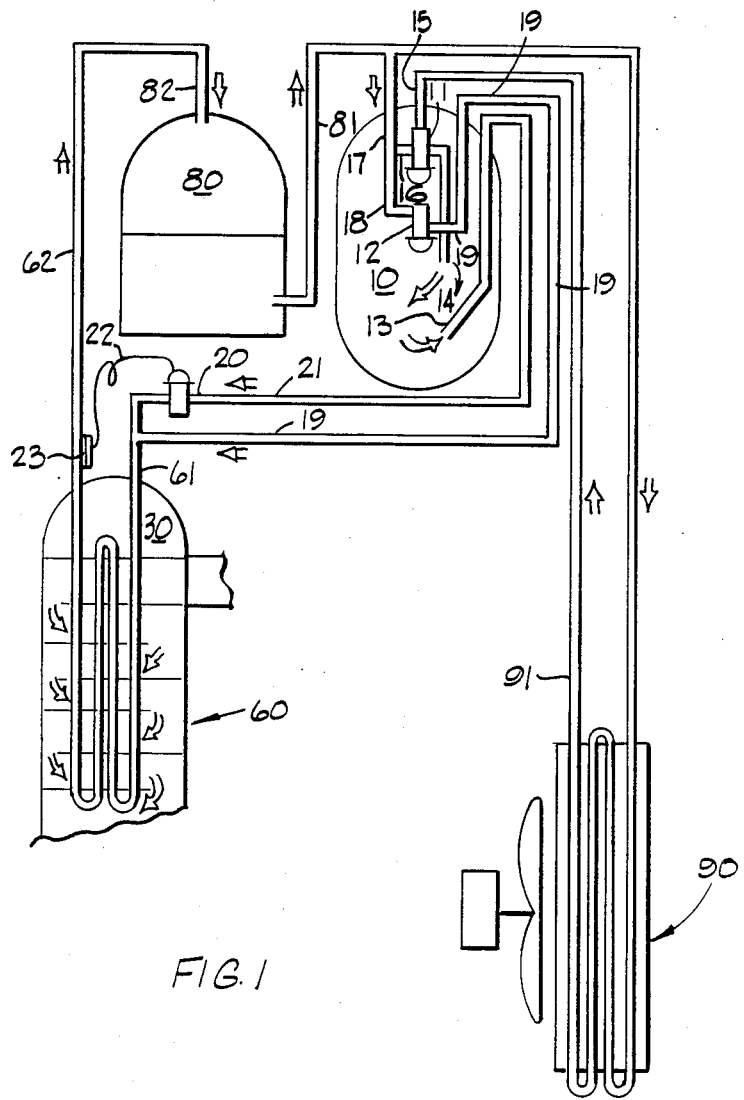
FIG. 1 is a schematic illustration of the refrigeration circuit of U.S. Pat. No. 4,718,245 and is a portion of FIG. 14 of that application.

Liquid refrigerant discharge conduit 13 is in fluid communication with expansion valve 20 through conduit 21. A small diameter gas conduit 22 is connected in fluid communication with the pressure dome of valve 20 and with a bulb 23 mounted in thermally conductive relationship with discharge conduit 62 of evaporator 60. Conduit 82 is the inlet to the suction side of compressor 80 and receives gaseous refrigerant from evaporator discharge conduit 62.

Valves 11, 12 and 20 are each of the same general type and include a dome at one end forming an inwardly opening cavity which is covered by a diaphragm. The diaphragm is connected to one end of the valve stem and a spring exerts force on the other end of the stem tending to move it in the direction of the diaphragm. The force of the spring is fixed but the force exerted on the stem by the diaphragm can be changed by changes in pressure on either side of the diaphragm. Thus the valves can be set to open and close at predetermined pressure levels and hence temperature levels in the domes and in conduits leading into and out of the valve bodies. The general construction and operation of these valves is well understood by those skilled in this art.

Of the valves 11, 12 and 20 the latter is the only one in which pressure in the dome is intended to be variable. The differentials between the force the spring exerts on the valve stem at one end of the valve body and the force exerted by the diaphragm at the other end of the stem in valves 11 and 12 are fixed so long as the temperature outside the domes remains relatively constant. Placing valves 11 and 12 within the receiver achieves a relatively constant temperature within the domes of the valves. The temperature and pressure in the dome of valve changes with changes in temperature in evaporator discharge line 62. The refrigeration circuit shown in FIG. 1 functions as described in the section headed "Background of the Invention," above.

Figure 2:
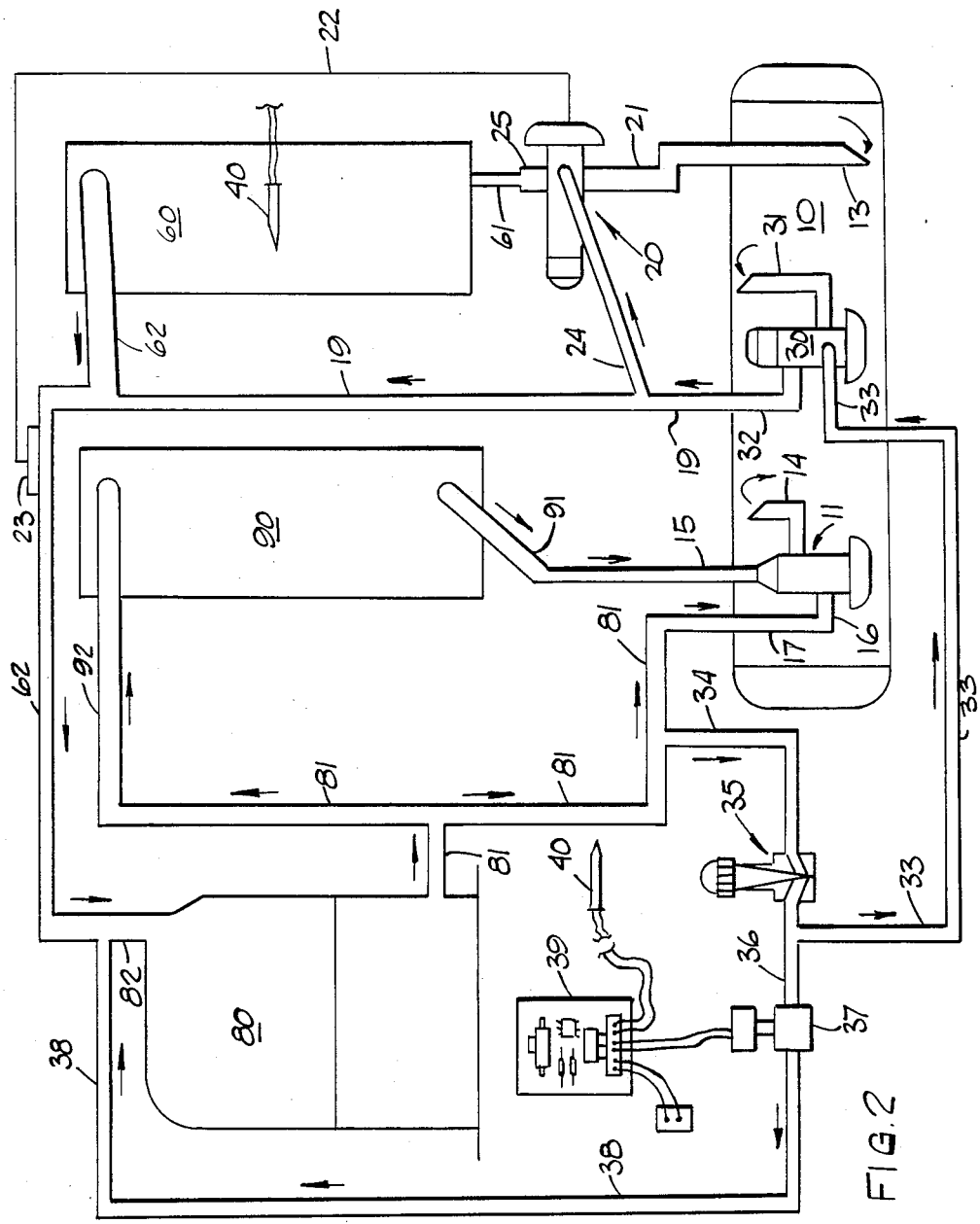
FIG. 2 is a schematic illustration of the refrigeration circuit of the present invention.

In FIG. 2 there is shown schematically a modified refrigeration circuit which is fundamentally the same as the circuit of FIG. 1 except that expansion valve bypass valve 30 in FIG. 2 differs from the valve 12 in FIG. 1 and the refrigeration circuitry to and from valve 30 is different. Evaporator 60, compressor 80 and condenser 90 are the same in both Figures. Expansion valve 20 in FIG. 2 differs from expansion valve 20 in FIG. 1. The discharge conduit 81 of compressor 80 has a branch 92 which is the inlet conduit for condenser 90. The remainder of conduit is in fluid communication with inlet 16 of condenser bypass valve 11 in receiver 10. Condenser outlet conduit is connected to inlet conduit 15 of valve 11 and through valve 11 and discharge conduit 14 is in fluid communication in normal operations with the interior of receiver 10. Conduit 34 is in fluid communication with conduit 81 and through needle valve 35 with conduit 33 leading to valve 30. Conduit 36 is connected in fluid communication with needle valve 35 and conduit 33 and through solenoid valve 37 with conduit 38 and compressor suction inlet 82. Solenoid valve 37 is controlled by electrical control circuit 39 electrically connected to temperature sensor 40 located in the middle portion of evaporator 60.

Conduit 31 is in fluid communication with the upper, vapor-containing portion of receiver 10 and through valve 30 with outlet conduit 32 and expansion valve bypass line 19. Discharge conduit 13 opens near the bottom or liquid-containing portion of receiver 10 and is connected in fluid communication with expansion valve 20 through inlet conduit 21. Conduit 24 is in fluid communication with expansion valve bypass line 19 and with the interior of expansion valve 20. Discharge line 25 of valve 20 is connected to the customary expansion orifice or orifices schematically illustrated at 61.

Figure 3:
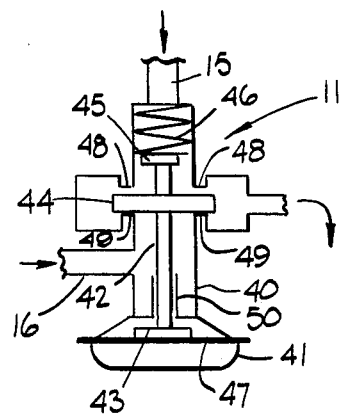
FIG. 3 is a schematic illustration of the condenser bypass valve.

Condenser bypass valve 11 is illustrated in greater, though schematic, detail in FIG. 3. It comprises a valve body 40, a pressure dome 41 and a valve stem 42 mounting discs 43, 44 and 45. A spring 46 exerts a downward force on the discs and stem and a diaphragm 47 covering pressure dome 41 and abutting disc 43 exerts an upward force on the discs and stem. Inlet 15 at the top of valve body 40 is in fluid communication with condenser discharge 91 (FIGS. 1 and 2) and inlet 16 is in fluid communication with compressor discharge conduit 81. Within valve body 40 there is an upper valve seat 48 and a lower valve seat 49 with valve disc 44 located between these two valve seats. Surrounding a lower portion of valve stem 42 is a cylindrical guide 50, the inside diameter of the guide being larger than the outside diameter of the stem so that the spacer within the valve body above and below the guide are in fluid communication. In normal operation the pressure of spring 46 and liquid refrigerant pressure in inlet 15 is greater than the pressure of the diaphragm and hot refrigerant in inlet 16 thus causing valve disc 44 to be seated on valve seat 49 and permit flow of liquid refrigerant from the condenser 90 through valve 11 into receiver 10. When condenser pressure in inlet 15 drops sufficiently because of low ambient temperatures, the pressure of the diaphragm 47 and hot gaseous refrigerant in inlet 16 moves the valve disc upwardly out of contact with valve seat 49 and into contact with valve seat 48, which shuts off flow of cold liquid refrigerant through inlet 15 and permits flow of hot gaseous refrigerant through outlet 14 into receiver 10.

Figure 4:
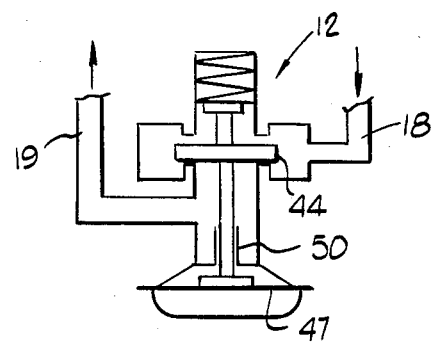
FIG. 4 is a schematic illustration of the expansion valve bypass valve of U.S. Pat. No. 4,718,245.

Expansion valve bypass valve 12 is illustrated in FIG. 4 and is essentially the same construction as valve 11 of FIG. 3 except there is only one inlet conduit and one outlet conduit there being inlet 18 in fluid communication with compressor discharge 81 (FIG. 1) and expansion valve bypass 19 in fluid communication with evaporator inlet conduit 61. When pressure in the evaporator drops because of low temperature and reduces pressure above diaphragm 47, the valve disc 44 moves upward and permits flow of hot gaseous refrigerant through valve 12 to the inlet of evaporator 60 (FIG. 1).

Figure 5:
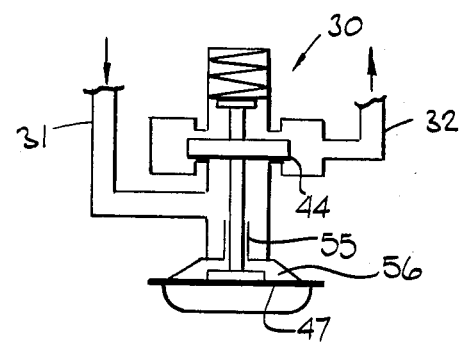
FIG. 5 is a schematic illustration of the expansion valve bypass valve of the present invention.

Referring to FIGS. 2 and 5, valve 30 is shown schematically as being identical with valve 12 of FIG. 4 in the construction of the upper portion. Valve stem guide 55 of valve 30, unlike guide 50 of valve 12, provides a gastight seal around the valve stem and thus closes or seals chamber 56 above diaphragm 47. The pressure in the dome beneath diaphragm 47 of valve 30 is normally open and vapor can pass from inlet conduit 31 through the valve to outlet conduit 32. Sealed chamber 56 is connected to conduit 33 in fluid communication with needle valve 35 and solenoid valve 37 (FIG. 2). When solenoid valve 37 is closed sealed chamber 56 receives compressed gas from compressor 80 and diaphragm 47 is pushed downward thus closing valve 30 and preventing flow of vapor through inlet 31 to outlet 32.

Expansion valve 20 of FIG. 2 is constructed basically the same as valve 12 of FIG. 4 except that conduit 24 is connected in fluid communication with the interior of the valve body adjacent to diaphragm 47 and conduit 22 is connected to the dome on the other side of the diaphragm as described above.

Under normal operating conditions, the refrigeration circuit of FIG. 2 functions the same as a conventional refrigeration circuit. Liquid refrigerant flows from receiver 10 through outlet 13 to expansion valve 20 which is open to flow of liquid through the valve to conventional orifices and into the evaporator 60. Gaseous refrigerant is drawn from the outlet 62 of evaporator 60 to the suction inlet 82 of compressor 80, is compressed to a high pressure hot gas and discharged through conduit 92 to condenser 90. Liquid refrigerant is discharged through conduits 91 and 15, through valve 11 and outlet conduit 14 to the interior of receiver 10. During this normal operation a portion of the compressed hot gaseous refrigerant flows through needle valve 35 to closed solenoid valve 37 and through conduit 33 to valve 30 closing valve 30 to flow of vapor from the receiver 10 to conduit 19. Needle valve 35 is adjusted so that the volume of gas in conduits 36 and 38 is relatively small compared to the volume of gas in conduit 81 and the diameters of these conduits are sized accordingly.

In cold weather, when the temperature of liquid refrigerant leaving the condenser 90 and entering the evaporator 60 from receiver 10 and expansion valve 20 could be so low as to cause formation of ice on the outside of the evaporator coils, valves 11, 30 and 37 (FIG. 2) are activated to control the temperature of the refrigerant in the middle of evaporator 60. The temperature sensor 40, in effect, sends a signal to electrical control circuit 39 indicting the temperature in the middle of evaporator 60. Control circuit 39 is pre-set to open solenoid valve 37 at any temperature below, say, 33° F. and to close valve 37 at any temperature above 35° F.

When solenoid valve 37 is closed high pressure gas in line 34, instead of being sucked into the inlet of compressor 80 through conduit 38, passes through conduit 33 into sealed chamber 56 (see FIG. 5) of expansion valve bypass valve 30. High pressure gas in sealed chamber 56 pushes diaphragm 47 downward and closes valve 30 preventing relatively warmer vapor from the upper portion of receiver 10 to flow the inlet 31, valve 30 and outlet 32 into expansion valve bypass conduit 19. Opening of valve 37 relieves pressure above diaphragm 47 in sealed chamber 56 and the pressure in the dome opens valve 30 permitting flow of vapor through the valve. Vapor from conduit 19 raises the pressure and the temperature in outlet conduit 62 and in the coils (not shown) of evaporator 60. Vapor from conduit 19 increases the pressure and temperature in line 24 and raises the temperature in the dome of valve 20. The rise in temperature in conduit 62 also through bulb 23 and conduit 22 raises the temperature in the dome of expansion valve 20.

Compared with the time required for valves 11 in both FIGS. 1 and 2 and valve 12 in FIG. 1 to respond to changes in temperature in the condenser and evaporator, the response in valves 37 and 30 of FIG. 2 is virtually instantaneous and this enables the refrigeration circuit of FIG. 2 to control the temperature in evaporator 60 to a much narrower range than is possible with the circuit of FIG. 1.

During start-up of the circuit of FIG. 2 when the temperature in the evaporator is below 32° F. in evaporator 60, the temperature in condenser 90 will be at least that low and the relatively low pressure in inlet 15 of valve 11 (see FIG. 3) permits pressure in dome 41 through diaphragm 47 to overcome the pressure from spring 46, move disc 44 away from set 49 and permit hot compressed gas to flow from inlet 16 through the valve body 40 and out of outlet 14 into receiver 10. The hot gas fed into receiver 10 heats the vapor in the upper portion of receiver 10 and also the liquid in receiver 10. This heating of the liquid in receiver 10 is gradual but even alone will eventually result in raising the temperature at expansion valve 20 and in any event this step is necessary in the circuit of FIG. 2 in order to bring the temperature in the evaporator to a stable level. Heating of the vapor in receiver 10 of course finally raises the temperature in the evaporator 60 and expansion valve 20 through action of valve 30.

When the temperature in evaporator 60 rises to the higher temperature preset in control circuit 39, solenoid valve 37 is closed, pressure in line 33 increases, valve 30 closes and the flow of vapor through valve 30 to the evaporator and expansion valve 20 stops. If the temperature of liquid from the condenser 90 to valve 11 is still too low, valve 11 will continue to route hot gas into the receiver until liquid refrigerant in the system is warm enough that the system operates without the action of either valve 11 or valve 30. Until that point is reached vales 30 and 37 will function to prevent a drop in temperature in the evaporator below just above freezing but will not function when the temperature in the evaporator rises to a slightly higher temperature such as 35° F. It is obviously more energy efficient to operate a refrigeration system with refrigerant temperatures and pressures as close to freezing as possible without running the risk of freezing around the evaporator coils. It is not essential that the vapor portion of receiver 10 be in fluid communication with a chamber in expansion valve 20 as shown in FIG. 2 but such an arrangement speeds the warming and normal functioning of the valve under cold conditions.

I claim:

1. A refrigeration system comprising, in combination, an evaporator, control means controlling the flow of a liquid refrigerant at a reduced pressure to said evaporator for producing a gaseous refrigerant at a lower pressure and temperature in said evaporator, a compressor for receiving said gaseous refrigerant from said evaporator and compressing said refrigerant to produce a refrigerant at an increased temperature and pressure, a condenser remote from said compressor and evaporator for receiving said refrigerant at increasing temperature and pressure and condensed the same to a liquid, a receiver for receiving said condensed liquid refrigerant, first transport means normally supplying said condensed liquid from said receiver to said control means, second transport means supplying said condensed liquid from said control means to said evaporator, a first bypass valve for supplying gaseous refrigerant at said increased pressure and temperature to the interior of said receiver and bypassing said condenser when the pressure in said receiver falls below a predetermined value, a second bypass valve for supplying gaseous refrigerant at an increased pressure and temperature directly to said second transport means and bypassing said control means when the temperature in said evaporator falls below a predetermined value.

2. The refrigeration system of claim 1 further comprising a temperature sensor located in said evaporator for measuring temperature and electrically transmitting temperature values to an electrical circuit controlling a valve, said control valve, when closed, routing hot gas from said compressor to said second bypass valve so as to close said second bypass valve against flow of said gaseous refrigerant through said second bypass valve, and said control valve, when opened, routing hot gas back to the compressor and away from said second bypass valve so as to open said second bypass valve and permit flow of said gaseous refrigerant through said second bypass valve and into said means in fluid communication with said evaporator.

3. The refrigeration system of claim 2 in which said gaseous refrigrant flowing through said second bypass valve is vapor from said receiver.

4. The refrigeration system of claim 2, further comprising means for maintaining said first and second bypass valves at a temperature and pressure that is relatively constant with respect to the external ambient temperature and pressure conditions to which the system is subjected.

* * * * *